(12) United States Patent
Tanaka

(10) Patent No.: US 6,256,106 B1
(45) Date of Patent: *Jul. 3, 2001

(54) TWO-WAY IMAGE PROCESSING SYSTEM AND IMAGE FORMING APPARATUS IN SUCH A SYSTEM

(75) Inventor: Tomonori Tanaka, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,938

(22) Filed: Apr. 28, 1998

(30) Foreign Application Priority Data

Apr. 30, 1997 (JP) .................................................... 9-112769
Apr. 14, 1998 (JP) .................................................. 10-102887

(51) Int. Cl.[7] .............................. G06F 15/00; H04N 1/00; H04N 1/32
(52) U.S. Cl. ........................... 358/1.15; 358/434; 358/442
(58) Field of Search ..................................... 358/434, 435, 358/438, 439, 440, 405, 401, 404, 407, 442, 444, 468, 1.15, 1.1, 1.18; 379/100.01

(56) References Cited

U.S. PATENT DOCUMENTS

| | | | |
|---|---|---|---|
| 4,290,085 | * 9/1981 | Koller | 358/264 |
| 4,398,221 | * 8/1983 | Yamaguchi | 358/280 |
| 5,019,916 | * 5/1991 | Ogura | 358/401 |
| 5,175,762 | * 12/1992 | Kochis et al. | 379/100 |
| 5,208,681 | * 5/1993 | Yoshida | 358/404 |
| 5,357,347 | * 10/1994 | Hirose et al. | 358/296 |
| 5,373,349 | * 12/1994 | Ito | 355/22 |
| 5,377,017 | * 12/1994 | Lam | 358/405 |
| 5,392,133 | * 2/1995 | Nakajima | 358/407 |
| 5,406,386 | * 4/1995 | Yamada | 358/406 |
| 5,428,458 | * 6/1995 | Aiba et al. | 358/434 |
| 5,485,282 | * 1/1996 | Takeda | 358/435 |
| 5,572,335 | * 11/1996 | Stevens | 358/442 |

FOREIGN PATENT DOCUMENTS 7-321976  12/1995  (JP) .

* cited by examiner

*Primary Examiner*—Madeleine Nguyen
(74) *Attorney, Agent, or Firm*—Oblon, Spivak, McClelland, Maier & Neustadt, P.C.

(57) ABSTRACT

A memory control unit of an image forming apparatus on the receiving side outputs a reception ready signal to an image forming apparatus on the transmitting side when the image forming apparatus on the receiving side is ready for reception of image data. The memory control unit of the image forming apparatus on the transmitting side outputs an output standby signal indicating that the image forming apparatus on the transmitting side is ready for output of image data, to an AND gate. A line synchronization signal generating unit 43 refers to an output of the AND gate so as to output a line synchronization signal when the reception ready signal from the image forming apparatus on the receiving side is asserted and the output standby signal is asserted.

51 Claims, 11 Drawing Sheets

⟵⟶ INDICATES THAT
MEMORY IS BEING ACCESSED

TWO-WAY IMAGE PROCESSING SYSTEM AND IMAGE FORMING APPARATUS IN SUCH A SYSTEM

BACKGROUND OF THE INVENTION

1. Field of the Invention

The present invention generally relates to an image processing system in which two or more image forming apparatuses such as digital copiers, scanners, printers and facsimile machines are connected to each other and, more particularly, to a two-way image processing system including such apparatuses.

2. Discussion of the Background

Recently, with the introduction of the digital technology in copiers, processing or editing of image data using an image memory has become available. For example, rotation of an image or repeating of an image is possible by controlling read addresses of the image. Images from a plurality of original documents may be copied to one sheet of transfer paper by controlling write addresses of the images. In order to implement such facilities, a copier should generally be provided with an image memory for at least a page of an original document.

Another aspect of note in the digital copiers produced recently is that the facilities provided by a plurality of copiers are integrated. For example, Japanese Laid-Open Patent Application No. 321976 discloses a method whereby a plurality of digital copiers are connected by a cable so that, when a first copier is in use outputting a copy and a second copier is not used, image data is transferred to the second copier so that the second copier can also output a copy.

Various methods for transferring image data are known. For example, in asynchronous transfer of the SCSI system, handshake between devices involved in the transfer is performed for each transferred data unit. Data is transferred by exchanging a data request signal and a data acknowledgement signal. However, such a method of transfer, when performed between two digital copiers, causes a slow response especially when the cable is long, causing the transfer time to be significantly extended.

According to a conceivable method of transfer, a transmitting copier may scan an original document at a regular speed so that image data is output in synchronization with a clock using a raster system. The transfer time in this case would be significantly reduced as compared to the transfer time in the SCSI system. However, the latter method has a disadvantage in that received data may not be properly processed when a transmitting copier and a receiving copier are of different types or when the performance of the copiers are not suitable.

SUMMARY OF THE INVENTION

Accordingly, an object of the present invention is to provide an image forming apparatus, a two-way image processing system and a two-way image processing method in which the aforementioned disadvantages are eliminated.

Another and more specific object of the present invention is to provide an image forming apparatus, a two-way image processing system and a two-way image processing method in which the transfer time is reduced without causing improper data processing.

The aforementioned objects can be achieved by an image forming apparatus for use in an image processing system in which image data is transferred in two ways, comprising: an image reading unit for reading an original document so as to generate local image data; a link transmission and reception unit for exchanging image data and signals relating to control, with another image forming apparatus; an image memory for storing image data for at least one line on the original document; a first selection unit for selecting one of the local image data generated by the image reading unit and remote image data received from an image forming apparatus on the transmitting side via the link transmission and reception unit; a data write unit for writing image data selected by the first selection unit to the image memory; a second selection unit for selecting one of the image data stored in the image memory, the remote image data received from the image processing apparatus on the transmitting side via the link transmission and reception unit and the local image data generated by the image reading unit; an image output unit for outputting image using image data selected by the second selection unit; a request signal transmitting unit for transmitting, via the link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side; a reception ready signal transmitting unit for transmitting, when the request signal is received via the link transmission and reception unit, a reception ready signal indicating that reception of the remote image data is enabled, to the image forming apparatus on the transmitting side, via the transmission and reception unit, prior to receiving the remote image data for one line on the original document; a reception ready signal receiving unit for receiving the reception ready signal from the image forming apparatus on the receiving side via the link transmission and reception unit; and an image data transmitting unit for transmitting the local image data for one line on the original document, a line synchronization signal and a clock synchronized with the local image data, to the image forming apparatus on the receiving side, via the transmission and reception unit, based on the reception ready signal received by the reception ready signal receiving unit.

The aforementioned objects can also be achieved by an image forming apparatus provided with an image data transmitting function, comprising: an image reading unit for reading an original document so as to generate image data; a link transmission and reception unit for transferring the image data to an image forming apparatus on the receiving side and for exchanging signals relating to control, with the image forming apparatus on the receiving side; an image memory for storing image data for at least one line on the original document; a data write unit for writing the image data generated by the image reading unit to the image memory; a selection unit for selecting one of the image data stored in the image memory, and the image data generated by the image reading unit; an image output unit for outputting image using image data selected by the selection unit; a request signal transmitting unit for transmitting, via the link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side; a reception ready signal receiving unit for receiving the reception ready signal from the image forming apparatus on the receiving side via the link transmission and reception unit; and an image data transmitting unit for transmitting the image data for one line on the original document, a line synchronization signal and a clock synchronized with the image data, to the image forming apparatus on the receiving side, via the transmission and reception unit, based on the reception ready signal received by the reception ready signal receiving unit.

The aforementioned objects can also be achieved by an image forming apparatus provided with an image data receiving function, comprising: an image reading unit for reading an original document so as to generate local image data; a link transmission and reception unit for exchanging image data and signals relating to control, with another image forming apparatus; an image memory for storing image data for at least one line on the original document; a first selection unit for selecting one of the local image data generated by the image reading unit and remote image data received from an image forming apparatus on the transmitting side via the link transmission and reception unit; a data write unit for writing image data selected by the first selection unit to the image memory; a second selection unit for selecting one of the image data stored in the image memory, the remote image data received from the image processing apparatus on the transmitting side via the link transmission and reception unit and the local image data generated by the image reading unit; an image output unit for outputting image using image data selected by the second selection unit; and a reception ready signal transmitting unit for transmitting, when a request signal for requesting image transfer from the image forming apparatus on the transmitting side to an image forming apparatus on the receiving side and also requesting image output at the image forming apparatus on the receiving apparatus is received via the link transmission and reception unit, a reception ready signal indicating that reception of the remote image data is enabled, to the image forming apparatus on the transmitting side, via the transmission and reception unit, prior to receiving the remote image data for one line on the original document.

The aforementioned objects can also be achieved by a two-way image processing system for transferring image between at least two image forming apparatuses connected to each other, wherein each of the image forming apparatuses comprises: an image reading unit for reading an original document so as to generate local image data; a link transmission and reception unit for exchanging image data and signals relating to control, with another image forming apparatus; an image memory for storing image data for at least one line on the original document; a first selection unit for selecting one of the local image data generated by the image reading unit and remote image data received from an image forming apparatus on the transmitting side via the link transmission and reception unit; a data write unit for writing image data selected by the first selection unit to the image memory; a second selection unit for selecting one of the image data stored in the image memory, the remote image data received from the image processing apparatus on the transmitting side via the link transmission and reception unit and the local image data generated by the image reading unit; an image output unit for outputting image using image data selected by the second selection unit; a request signal transmitting unit for transmitting, via the link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side; a reception ready signal transmitting unit for transmitting, when the request signal is received via the link transmission and reception unit, a reception ready signal indicating that reception of the remote image data is enabled, to the image forming apparatus on the transmitting side, via the transmission and reception unit, prior to receiving the remote image data for one line on the original document; a reception ready signal receiving unit for receiving the reception ready signal from the image forming apparatus on the receiving side via the link transmission and reception unit; and an image data transmitting unit for transmitting the local image data for one line on the original document, a line synchronization signal and a clock synchronized with the local image data, to the image forming apparatus on the receiving side, via the transmission and reception unit, based on the reception ready signal received by the reception ready signal receiving unit.

The aforementioned objects can also be achieved by an image processing method for transferring image data between at least two image forming apparatuses connected to each other, comprising the steps of: reading an original document so as to generate local image data; transmitting a request signal for requesting image transfer from an image forming apparatus on the transmitting side to an image forming apparatus on the receiving side and also requesting image output at the image forming apparatus on the receiving apparatus, from the image forming apparatus on the transmitting side to the image forming apparatus on the receiving side; the image forming apparatus that receives the request signal transmitting a reception ready signal indicating that image reception is enabled, to the image forming apparatus on the transmitting side, prior to receiving remote image for one line on the original document; and the image forming apparatus on the transmitting side transmitting image data for one line on the original document, a line synchronization signal and a clock synchronized with the image data, to the image forming apparatus on the receiving side.

According to the image forming apparatus, the two-way image processing system and the two-way image processing method of the present invention, the reception ready signal indicating that the image forming apparatus on the receiving side is ready for reception of image data is transmitted to the image forming apparatus on the transmitting side prior to each reception of image data for one line. In response to the reception ready signal, the image forming apparatus on the transmitting side transmits image data to the image forming apparatus on the receiving side. With this arrangement, the transfer time is reduced without causing improper data processing.

The clock may be generated locally.

According to this aspect of the invention, image transfer adapted for the local processing speed can be performed.

The clock may also be generated in the other image forming apparatus.

According to this aspect of the invention, image transfer adapted for the other image forming apparatus can be performed.

The image forming apparatus may further comprise an operation unit for generating image related information based on an input supplied by an operator.

According to this aspect of the present invention, the image related information based on an input provided by an operator is transmitted to the image forming apparatus on the receiving side so that the image forming apparatus on the receiving side refers to the image related information before transmitting the reception ready signal.

In a two-way image processing system comprising a first image forming apparatus and a second image forming apparatus, the image data from the first image forming apparatus may be output only in the first image forming apparatus; only in the second image forming apparatus; or both in the first and second image forming apparatuses.

According to these aspects of the invention, a variety of output configurations are possible in a two-way image processing system. For example, an image forming apparatus in which image information is prohibited from leaking outside may be configured such that the local image information is output only locally. Thus, a requirement for high-level security is met.

The image memory may store image data for a plurality of original documents.

According to this aspect of the invention, it is ensured that at least one of the image forming apparatus on the transmitting side and the image forming apparatus on the receiving side is provided with an image memory capable of storing image data for a plurality of pages. Thus, a highly productive two-way image processing system in which the processing speed on the transmitting side and that of the receiving side are not sacrificed.

A transfer error may be detected line by line or page by page.

According to this aspect of the invention, it is possible to provide a reliable two-way image processing system which is highly resistant to an abrupt disconnection in a transmission line or the like.

Image data may be compressed before transfer.

According to this aspect of the invention, the transfer rate can be improved. As a result, it is possible to provide a reliable two-way image processing system in which the rate of transfer errors is reduced.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
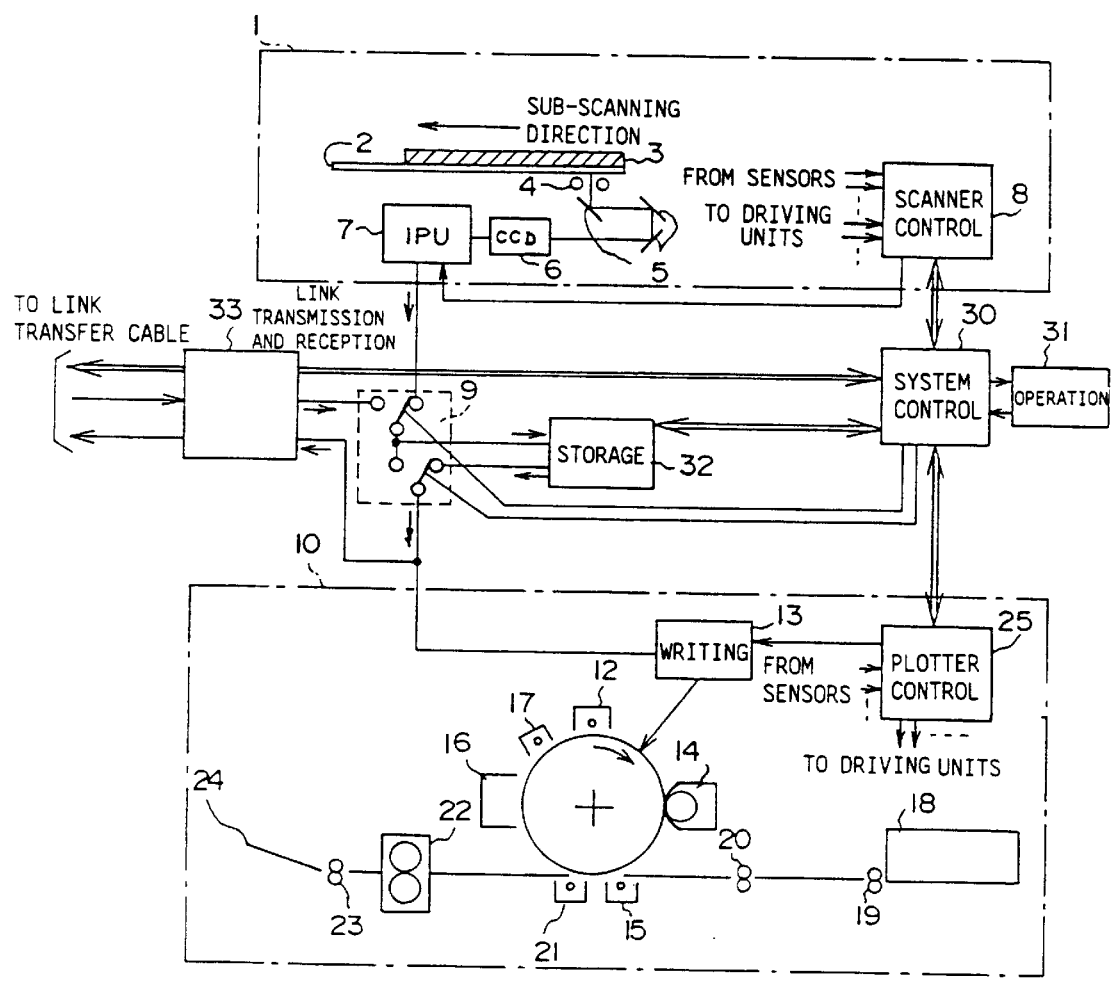
FIG. 1 is a block diagram of a digital copier constituting a two-way image processing system according to an embodiment of the present invention.
Figure 2:
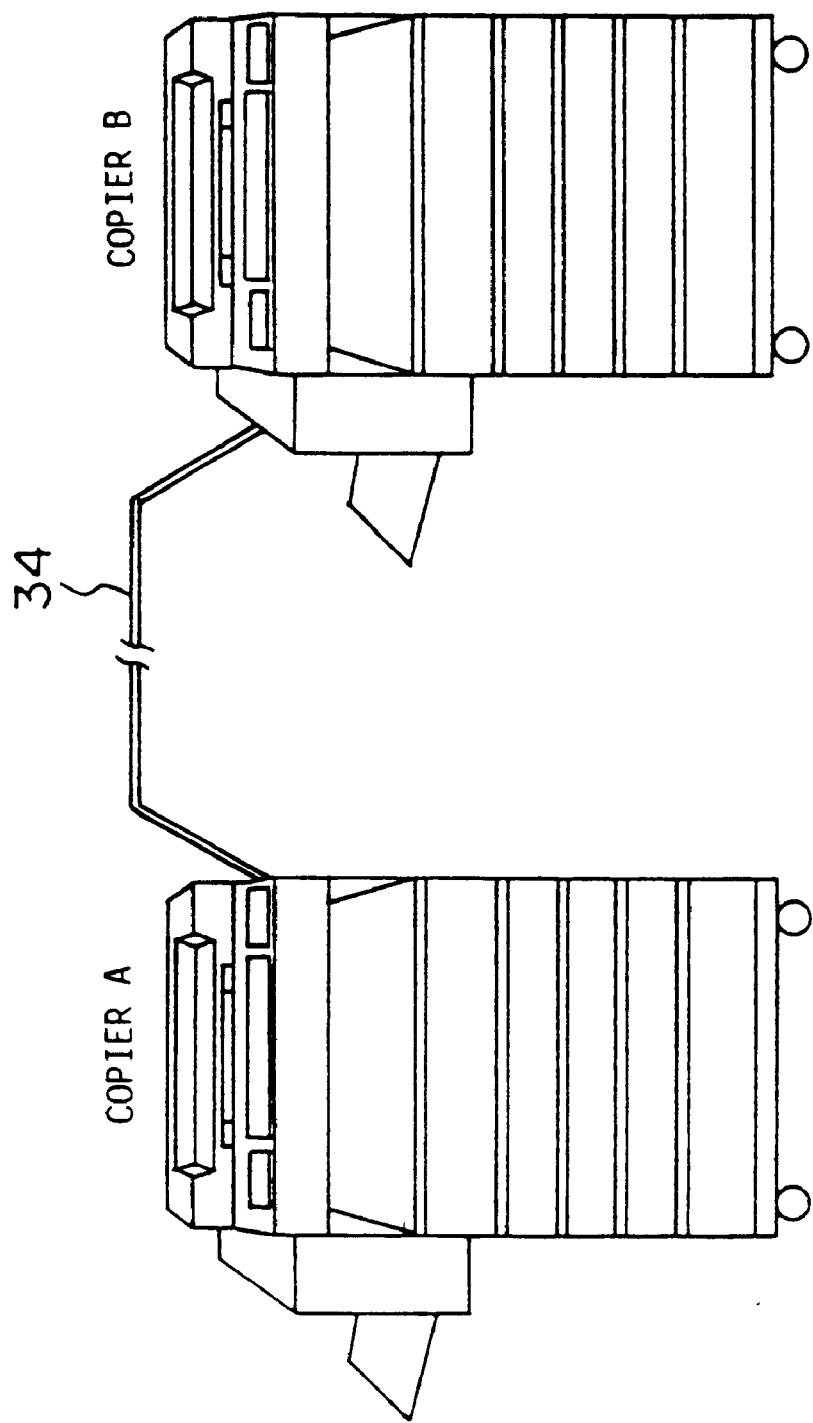
FIG. 2 is a block diagram showing a two-way image processing system in which two digital copiers of FIG. 1 are connected to each other by a cable.
Figure 3:
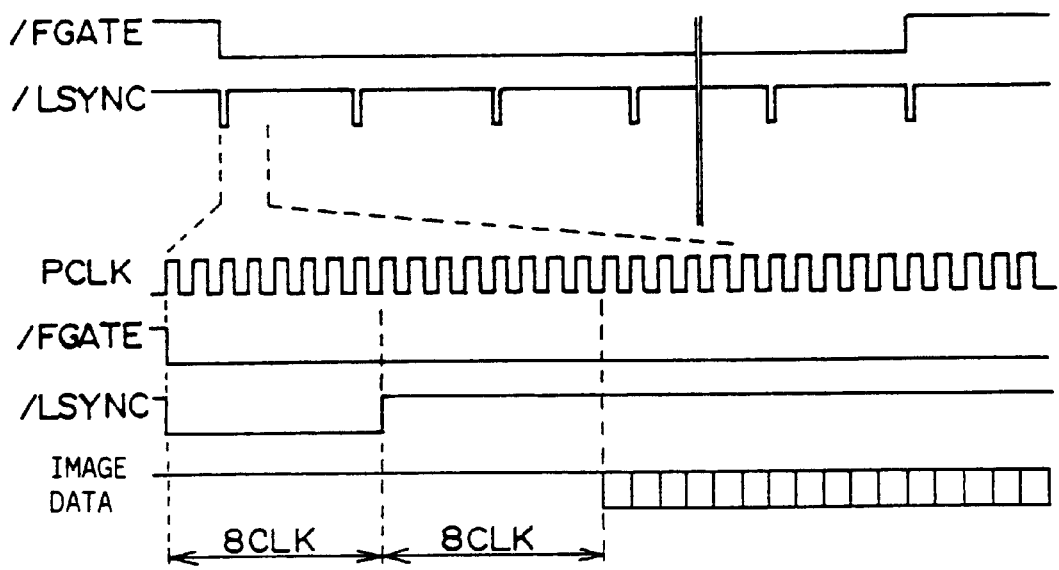
FIG. 3 is a timing chart showing how a synchronization signal for image data is output from IPU shown in FIG. 1.
Figure 4:
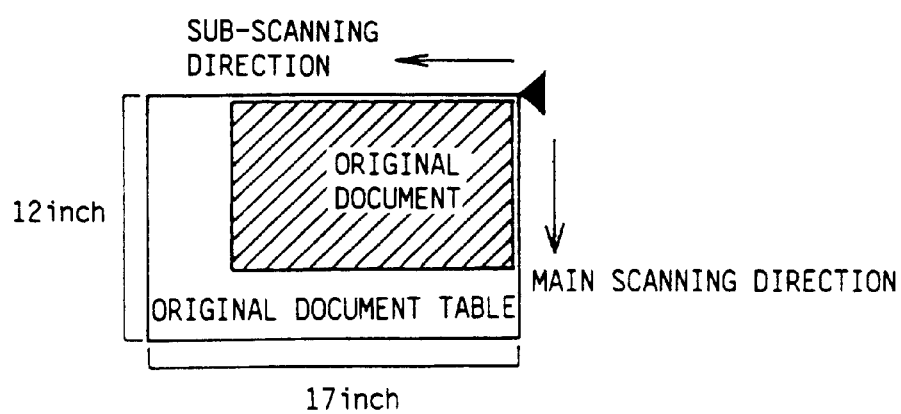
FIG. 4 is an illustration of an original document.
Figure 5:
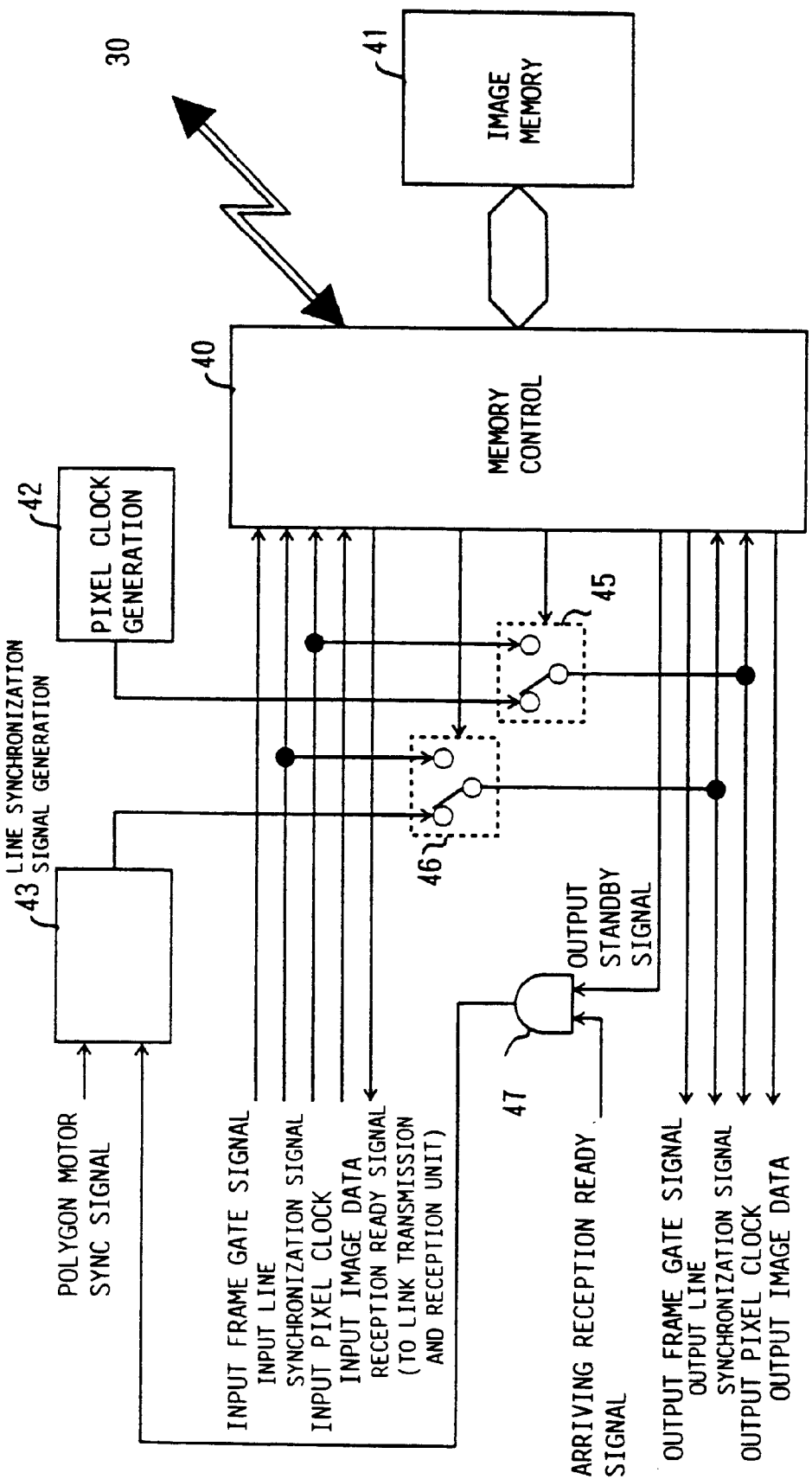
FIG. 5 is a block diagram showing a detailed construction of a storage unit shown in FIG. 1.
Figure 6:
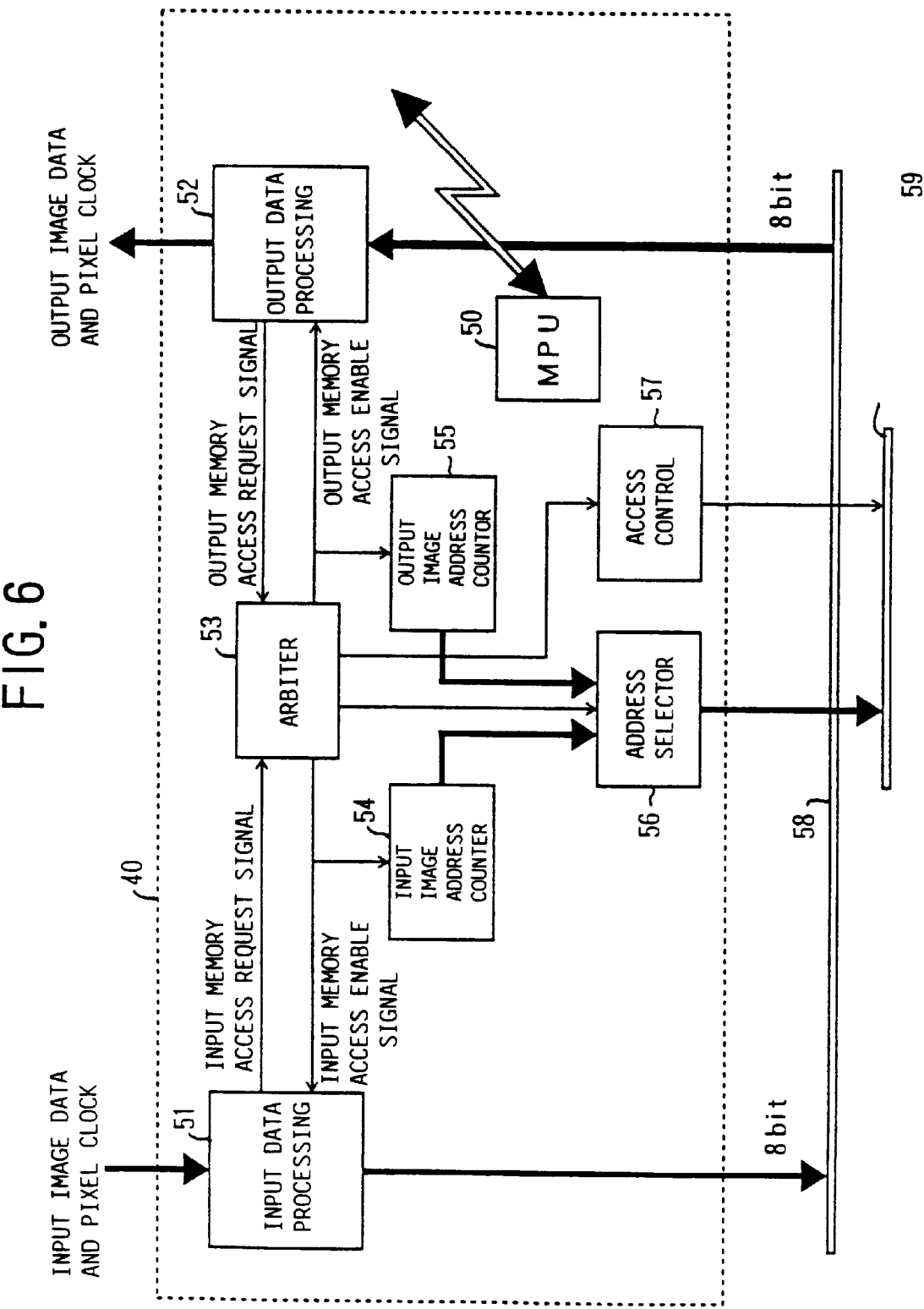
FIG. 6 is a block diagram showing a detailed construction of a memory control unit shown in FIG. 5.
Figure 7:
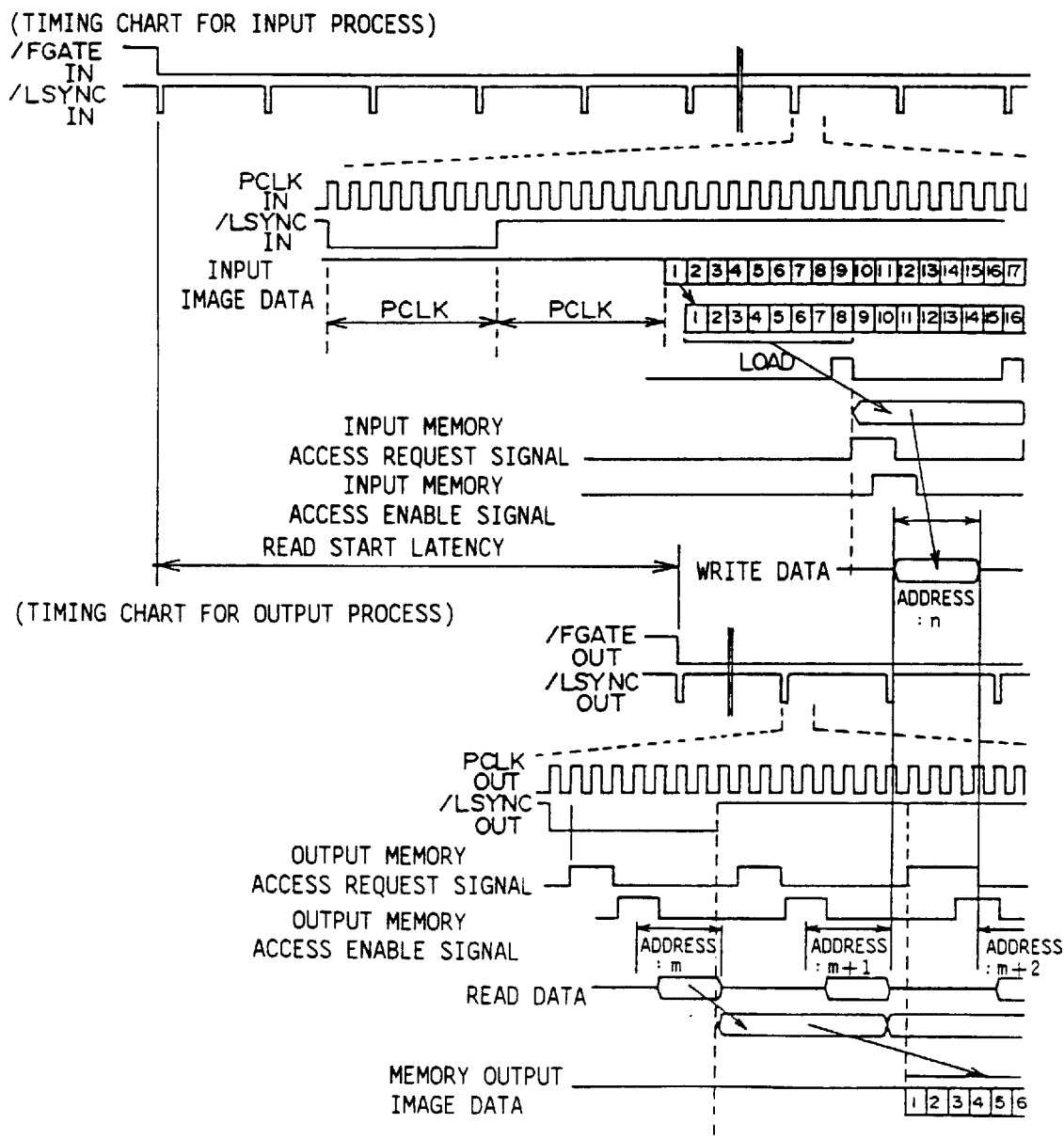
FIG. 7 is a first half of a timing chart showing a write operation and a read operation performed by a memory control unit.
Figure 8:
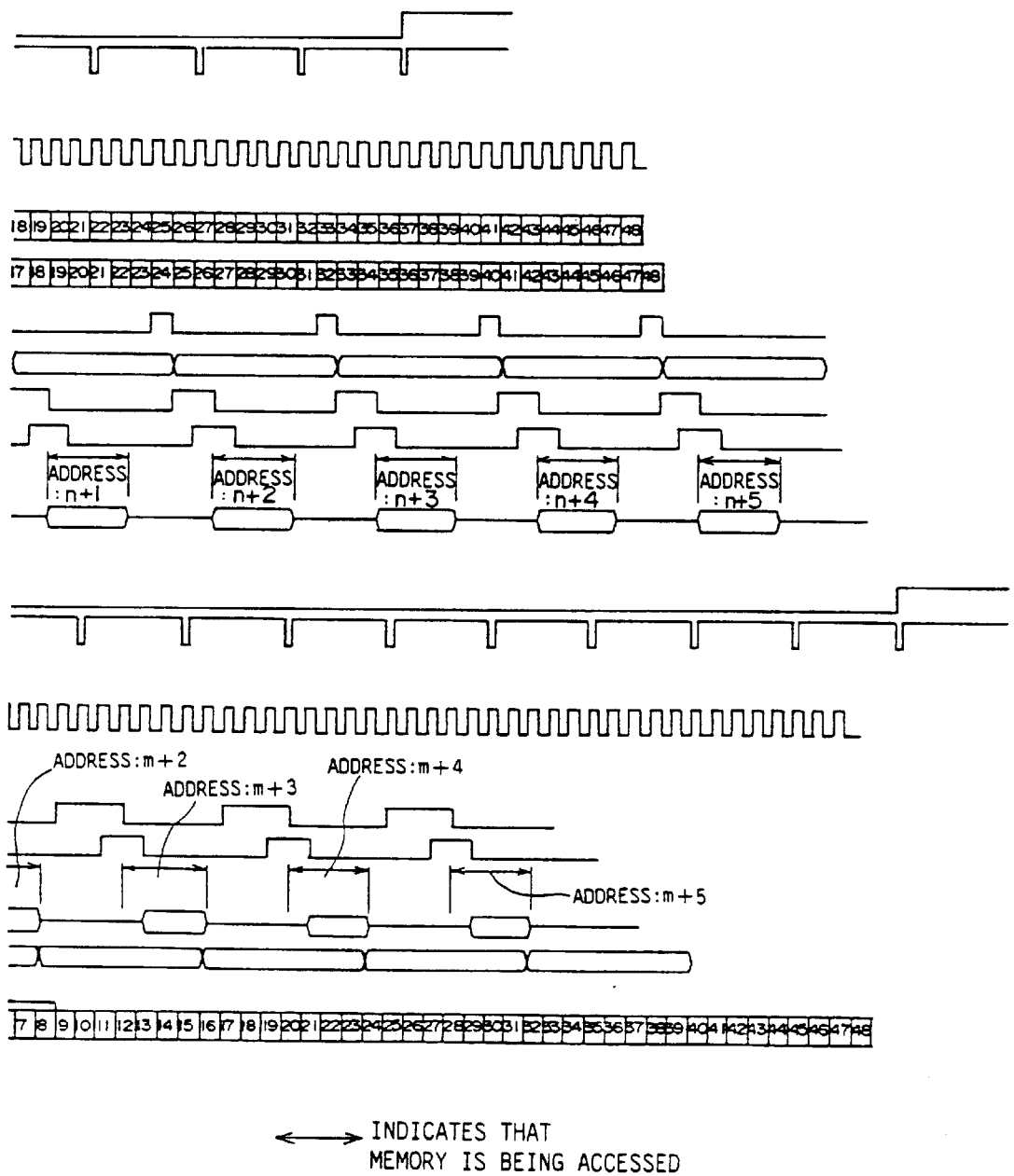
FIG. 8 is a second half of the timing chart showing a write operation and a read operation performed by the memory control unit.
Figure 9:
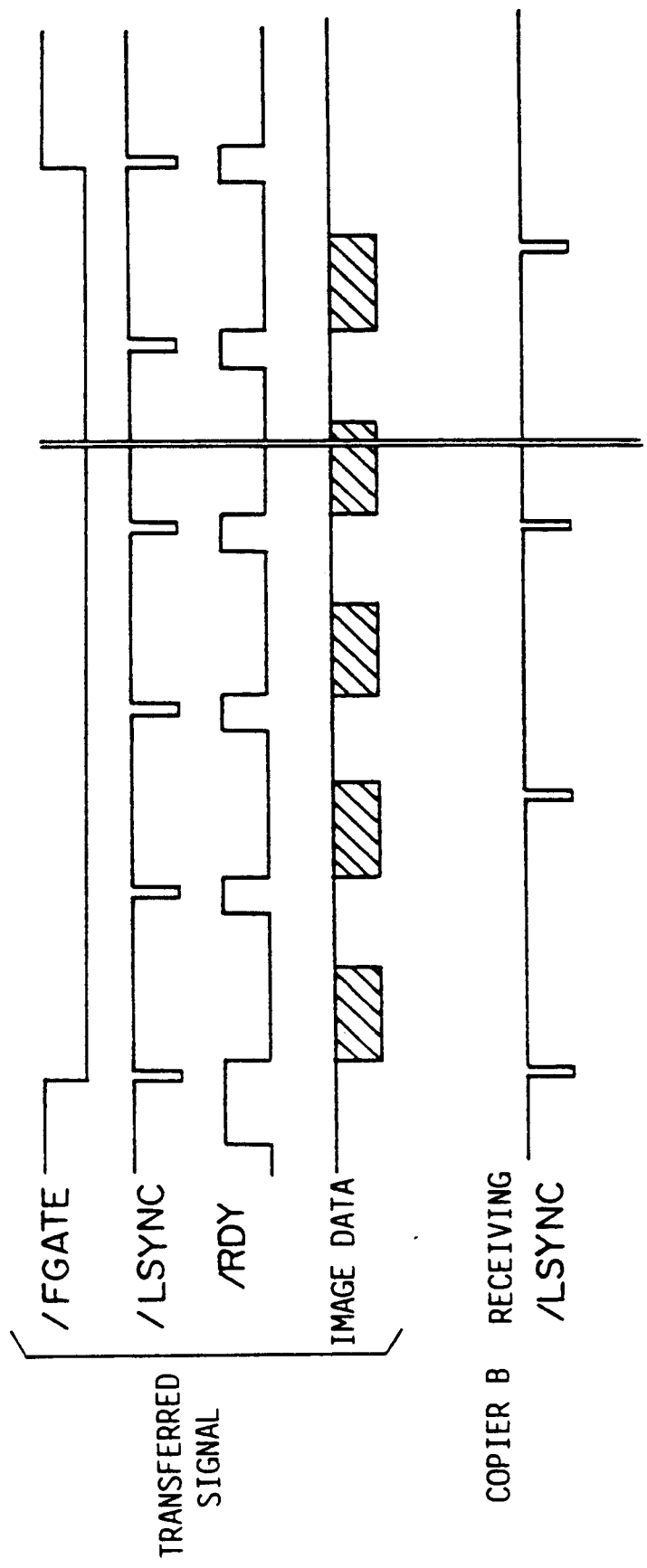
FIG. 9 is a timing chart in which a write interval in copier A is shorter than that of copier B.
Figure 10:
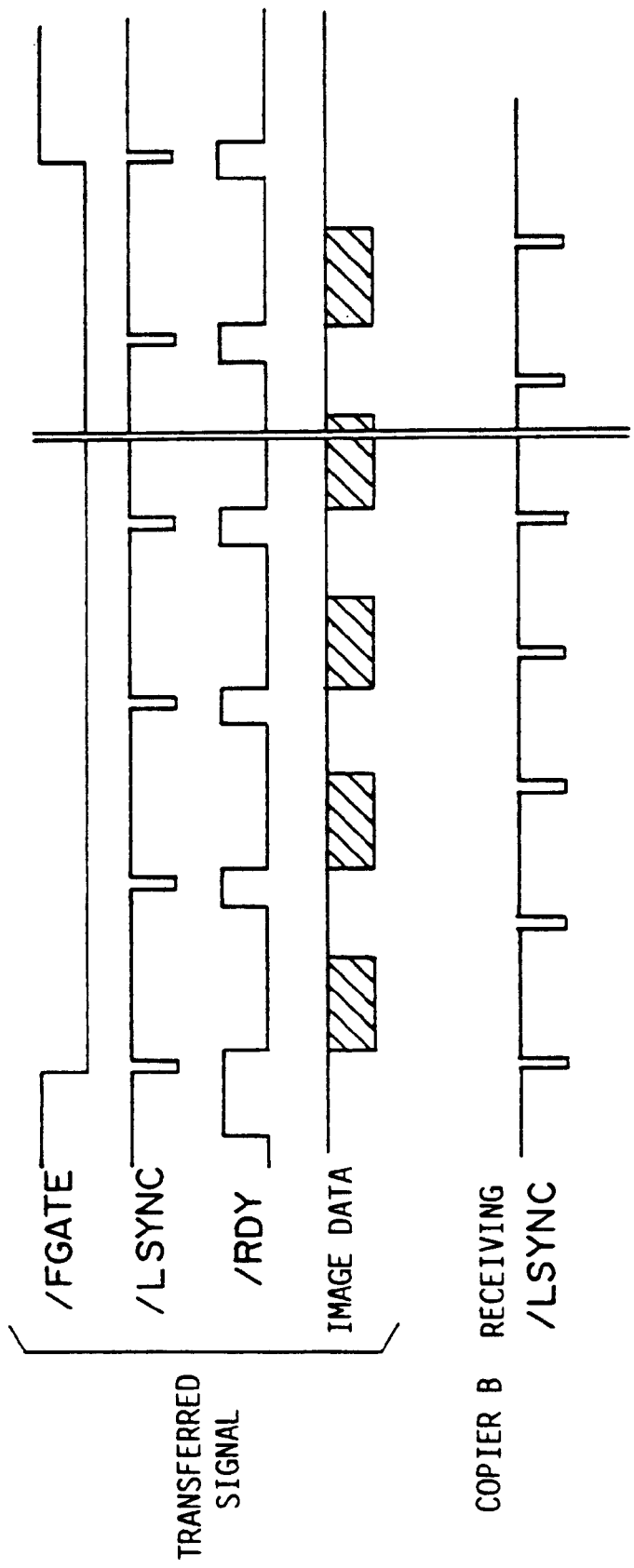
FIG. 10 is a timing chart in which a write interval in copier B is shorter than that of copier A.
Figure 11:
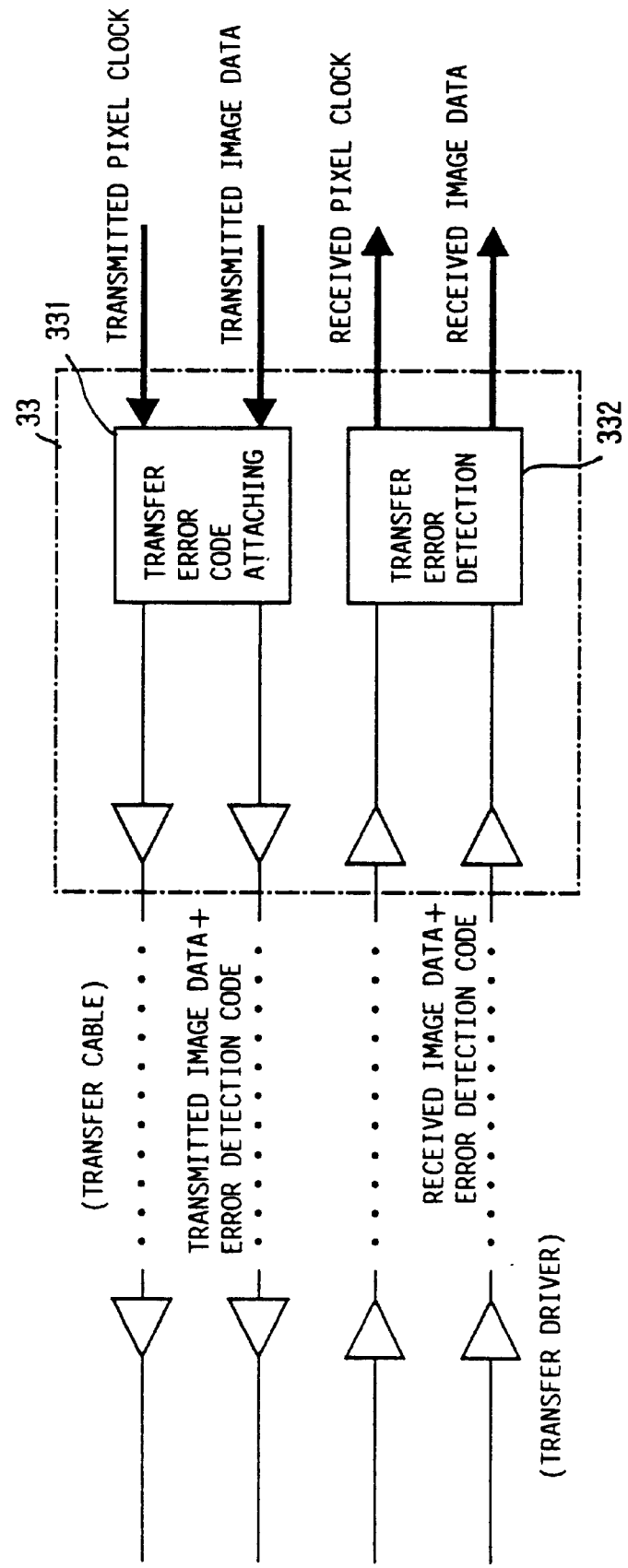
FIG. 11 is a block diagram showing a link transmission and reception unit of FIG. 1.
Figure 12:
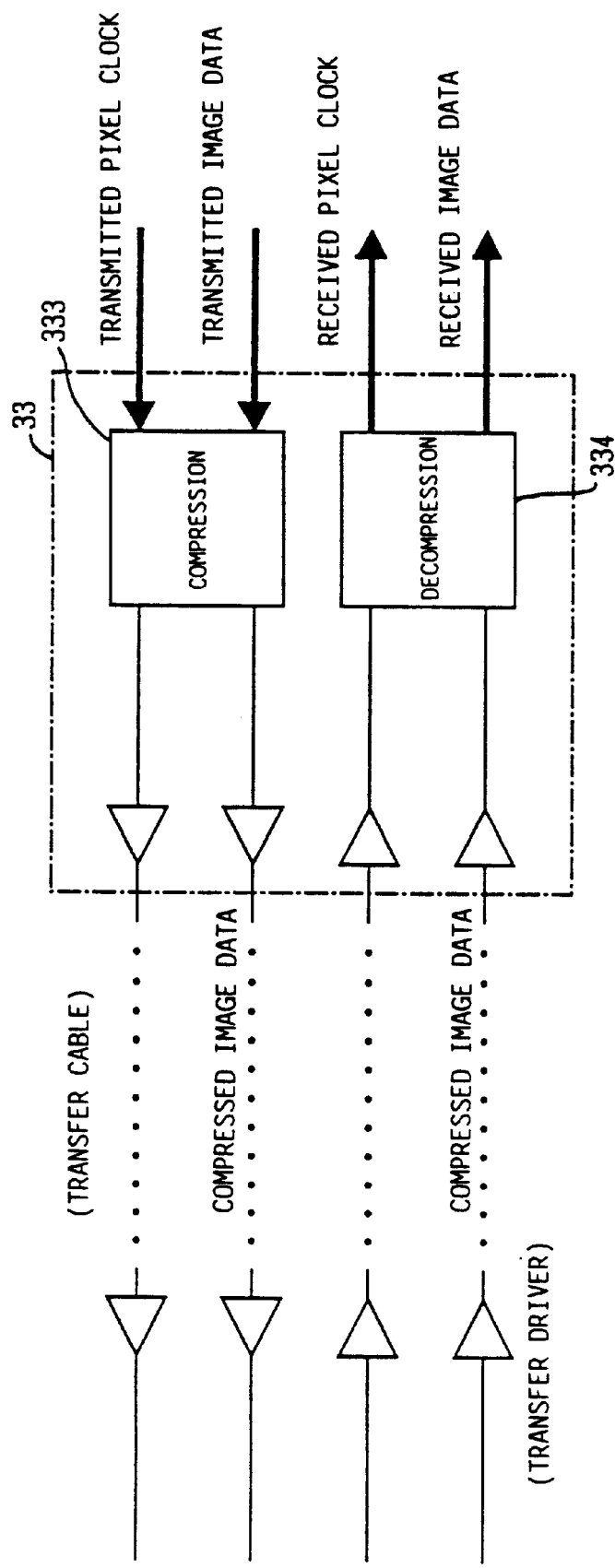
FIG. 12 is a block diagram showing another link transmission and reception unit.

FIG. 1 is a block diagram of a digital copier constituting a two-way image processing system according to an embodiment of the present invention. FIG. 2 is a block diagram showing a two-way image processing system in which two digital copiers of FIG. 1 are connected to each other by a cable. FIG. 3 is a timing chart showing how a synchronization signal for image data is output from IPU shown in FIG. 1. FIG. 4 is an illustration of an original document. FIG. 5 is a block diagram showing a detailed construction of a storage unit shown in FIG. 1. FIG. 6 is a block diagram showing a detailed construction of a memory control unit shown in FIG. 5. FIG. 7 is a first half of a timing chart showing a write operation and a read operation performed by a memory control unit. FIG. 8 is a second half of the timing chart showing a write operation and a read operation performed by the memory control unit. FIG. 9 is a timing chart in which a write interval in copier A is shorter than that of copier B. FIG. 10 is a timing chart in which a write interval in copier B is shorter than that of copier A. FIG. 11 is a block diagram showing a link transmission and reception unit of FIG. 1. FIG. 12 is a block diagram showing another link transmission and reception unit.

A reader unit 1 shown in FIG. 1 illuminates an original document 3 placed on an original document table 2 by an exposure lamp 4. A light beam reflected by the original document 3 is guided to a CCD image sensor 6 via a mirror 5. The CCD image sensor 6 converts the image beam into an electric signal commensurate with intensity of the light beam. An image processing unit (IPU) 7 subjects the electric signal to shading correction and the like, and subjects the resultant signal to A/D conversion so as to convert it into an 8-bit digital signal. IPU 7 further subjects the digital signal to a variable power process and a dither process, and transmits the resultant signal to a write unit 13 or a storage unit 32 in an image forming unit 10, via a selector 9. A scanner control unit 8 receives inputs from various sensors and controls a motor (not shown) in the read unit 1 so that the above-described process is properly performed in the read unit 1. The scanner control unit 8 also sets various parameters for IPU 7.

In the image forming unit 10, the surface of a photosensitive drum 11 rotated clockwise at a constant speed of revolution is uniformly charged by a charger 12. The write unit 13 forms a latent image on the surface of the photosensitive drum 11 by a laser beam modulated in accordance with image data. The latent image is then developed by a toner at a developing unit 14. The toner image is transferred to transfer paper by a transfer charger 15. Thereafter, the toner that remains on the surface of the photosensitive drum 11 is removed by a cleaning unit 16. A discharger 17 removes residual charge on the surface of the photosensitive drum 11.

The transfer paper set in a paper feed tray 18 is fed by a paper feed roller 19 and is then transported by a registration roller 20 to a location opposite to the toner image on the photosensitive drum 11. After the toner image is transferred to the transfer paper by the transfer charger 15, the transfer paper is removed from the photosensitive drum 11 by a separation charger 21. The toner image on the transfer paper is fixed by a fixing unit 22. The transfer paper is ejected onto a paper eject tray 24 via a paper eject roller 23. A plotter control unit 25 receives inputs from various sensors and controls a motor (not shown) in the image forming unit 10 so that the above-described process is properly performed in the image forming unit 10.

The digital copier of FIG. 1 also comprises a system control unit 30, an operation unit 31, the storage unit 32 and a link transmission and reception unit 33. An instruction to the system controller 30 is issued in the form of a keyboard input provided by an operator using the operation unit 31. The system control unit 30 monitors an input at the operation unit 31, sets various parameters for the scanner control unit 8 in the read unit 1, the storage unit 32, and the plotter control unit 25 in the image forming unit 10. The system control unit 30 also supervises a process execution and displays the status of the system as a whole in the operation unit 31.

The storage unit 32 stores image data for an original document supplied thereto by IPU 7 via the selector 9 so that the data is used for copying applications such as a repeat copy and a rotation copy. In accordance with an instruction from the system control unit 30, the selector unit 9 switches between the read unit 1 and the storage unit 32 to supply a source image data to the image forming unit 10. The selector unit 9 also switches between the read unit 1 and the link transmission and reception unit 33 to provide image data to be stored in the storage unit 32. The link transmission and reception unit 33 is constructed of a driver for driving a link transfer cable 34. For example, as shown in FIG. 2, the link transmission and reception units 33 of two copiers (copier A and copier B) are connected to each other via the link transfer cable 34.

The image data output by IPU 7 is synchronized with synchronization signals as shown in FIG. 3. A frame gate signal (/FGATE) indicates a range in the sub-scanning direction in which range the image is effective. The image data is effective while the frame gate signal (/FGATE) is in a logical low state (low-active). The frame gate signal (/FGATE) is asserted and negated at a leading edge of a line synchronization signal (/LSYNC). The line synchronization signal (/LSYNC) is asserted at a leading edge of a pixel clock (PCLK) and remains asserted while a predetermined number of pixel clock (PCLK) pulses are output. After a predetermined number of clock pulses are output starting at the leading edge of the signal /LSYNC, the image data becomes effective in the main scanning direction.

IPU 7 supplies a unit of image data for a period of the pixel clock (PCLK). The image data supplied by IPU 7 has a resolution of 400 dpi in the main scanning direction and the sub-scanning direction. The head of the image data supplied by IPU 7 corresponds to the corner indicated by the arrow in FIG. 4. The image data is output as raster data such that the data for an image at the arrow is located at the head of the raster image data. The effective range of the image data in the sub-scanning direction is normally determined by the size of the transfer paper.

A detailed description will now be given, with reference to FIG. 5, of the construction of the storage unit 32. A memory control unit 40 of a receiving copier outputs a reception ready signal to a transmitting copier when the receiving copier is ready for reception of image data. The memory control unit 40 of the transmitting copier outputs an output standby signal to one input of an AND gate 47 when the transmitting copier is ready. The reception ready signal from the receiving copier is supplied to the other input of the AND gate 47. An output signal from the AND gate 47 is supplied to a line synchronization signal generating unit 43.

An image memory 41 for storing image data is formed by storage elements such as a DRAM. Writing and reading of data to and from the image memory 41 is controlled by the memory control unit 40. Generally, the image memory 41 is capable of storing 4M bytes of data. By installing additional memories, it is of course possible to store image data for several pages of documents. A pixel clock generating unit 42 is formed by an oscillation circuit and outputs a clock having a predetermined frequency to a selector 45.

The line synchronization signal generating unit 43 is formed by a logic circuit such as a TTL. Generally, the line synchronization signal generating circuit 43 generates a line synchronization signal in accordance with a synchronization signal of a polygon motor in the write unit 13 of the image forming unit 10, and outputs the line synchronization signal to the selector 46. When the image data is transferred to the link transmission and reception unit 33, the line synchronization signal generating circuit 43 generates a line synchronization signal when the reception ready signal from the receiving copier is asserted and the output standby signal, indicating that the output is in a standby state, is also asserted. The line synchronization signal generating unit 43 determines that the reception ready signal is asserted and the output standby signal is also asserted by referring to an output of the AND gate 47.

The selector 45 is formed by a TTL gate and selects, under the control of the memory control unit 40, the pixel clock supplied by the pixel clock generating unit 42 or the pixel clock supplied by an external device. The selector 46 is also formed by a TTL gate and selects, under the control of the memory control unit 40, the line synchronization signal supplied by the line synchronization signal generating unit 43 or the line synchronization signal supplied by an external device.

A detailed description will now be given, with reference to FIGS. 6–8, of a construction of and a process performed by the memory control unit 40. FIG. 7 shows a first half of a timing chart showing the process performed by the memory control unit 40, and FIG. 8 shows a second half of a timing chart. The memory control unit 40 is formed by an MPU 50 and other logic blocks having respective functions. MPU 50 communicates with the system control unit 30 so as to control the operation of the logic blocks in accordance with a command received from the system control unit 30. MPU 50 also sends status information indicating the status of the storage unit 32 to the system control unit 30.

An input data processing unit 51 receives input image data having a 1-bit width and an input pixel clock as shown in FIGS. 7 and 8. The input data processing unit 51 packs the image data to fit it to an 8-bit data width and outputs the 8-bit data to an image data bus 58. Since the input clock differs from the clock controlling the internal operation, the input data processing unit 51 synchronizes the input image data with the internal operation clock generated by a clock generation circuit (not shown). In contrast with the input data processing unit 51, an output data processing unit 52 receives image data having an 8-bit data width from the image data bus 58, subjects the image data to parallel-serial conversion and outputs 1-bit image data together with an output pixel clock. Since the output clock differs from the internal operation clock, the output data processing unit 52 synchronizes the output image data with the output clock.

The input data processing unit 51 outputs a reception ready signal to the link transmission and reception unit 33 in an input standby state. The output data processing unit 52 outputs an output standby signal to an external device in an output standby state.

An arbiter 53 arbitrates between an input memory access request signal output from the input data processing unit 51 and an output memory access request signal output from the output data processing unit 52. The arbiter 53 supplies an input memory access enable signal to the input data processing unit 51 and an input image address counter 54, and supplies an output memory access enable signal to the output data processing unit 52 and an output image address counter 55. The arbiter 53 also outputs a signal for selecting an address of the input image address counter 54 or the output image address counter 55, to an address selector 56, and outputs an access enable signal to an access control circuit 57.

The input image address counter 54 and the output image address counter 55 have the same construction. The input image address counter 54 increments the count thereof in response to the input memory access enable signal from the arbiter 53. The output image address counter 55 increments the count thereof in response to the output memory access enable signal from the arbiter 53. The address selector 56 selects a read address or a write address based on a selection signal from the arbiter 53, outputs higher 11 bits of the selected address to an image address bus/control signal line 59 as a row address in the image memory (DRAM) 41, and outputs the lower 11 bits to the image address bus/control signal line 59 as a column address in the image memory 41.

The access control circuit 57 outputs DRAM control signals (RAS, CAS, WE signals) to the image address bus/control signal line 59, in response to the access enable signal from the arbiter 53.

Referring to FIG. 2, it is assumed that copier A is a transmitting copier and copier B is a receiving copier. For example, copier A is used to output ten copies, while copier B is not used. In this case, the system control unit 30 of copier A sends a request signal to the system control unit 30 of copier B, requesting image transfer and image copy output. Copier A also informs copier B of image related information which may include an image size in the main scanning direction and in the sub-scanning direction, and the number of copies needed. Copier B refers to the image related information and, when it is determined that reception is possible, copier B acknowledges the request by a reception ready signal returned to copier A.

Write periods (line period) of copiers A and B are examined so as to determine which of the copiers has an image forming unit having a higher processing speed, and to determine which of the copiers is to adapt itself to a difference in the line period between copier A and copier B. When copier A or copier B has an image memory capable of storing image data for a plurality of pages, the copier having that image memory stores the image data in the image memory and transmits or receives the image data in synchronization with the line synchronization signal transmitted by the other copier. In this way, transmission and reception of image data is possible without reducing the image forming processing speed of the copiers A and B.

A description will be given below of a case where copier B on the receiving side has an image memory capable of storing image data for a plurality of pages.

When the processing speed of copier B is higher than that of copier A (that is, when a write interval of copier B is shorter than that of copier A: FIG. 10), a wait time is introduced because copier B is prevented from an image forming process at a speed higher than the read speed of copier A. As a result, copier B is operated to provide the same performance as copier A. FIGS. 7 and 8 are timing charts showing how copier B starts an input process, experiences a read start latency and starts an output process. The duration of the read start latency is calculated such that a read address m at which image data is read from the image memory does not surpass a write address n at which image data is written in the image memory, based on the line synchronization signal on the receiving side and that of the transmitting side.

When the processing speed of copier B is lower than that of copier A (that is, when copier B has a longer write interval than copier A: FIG. 9), copier B, even at a full-scale operation, cannot output an image at a sufficiently fast rate since the volume of data transferred from copier A surpasses the performance of copier B. In this case, the image data is stored in the image memory. Accordingly, it is possible to transmit and receive image data without causing a drop in the speed of the image forming process in copiers A and B.

The image read by a scanner in the copier A may be output only in copier A while copier B is in use; only in copier B when the scanner in copier A is unused but the image forming unit thereof is in use or when the image forming unit of copier A cannot be used due to a failure or the like; or both in copiers A and B when the image forming units of copiers A and B are not used.

Copier A may be operated in any of the three output configurations described above depending on the situation. The operation unit of copier A may also be configured such that copier B is not used.

FIG. 11 shows the link transmission and reception unit 33 according to one embodiment. A transfer error code attaching unit 331 is provided constitute a data transmission part in the link transmission and reception unit 33. The transfer error code attaching unit 331 attaches a code, a sum of transferred data, to the end of a line. A transfer error detecting unit 332 is provided to constitute a data reception part in the link transmission and reception unit 33. The transfer error detecting unit 332 detects a transfer error by comparing the code attached at the end of the line with the sum of the transferred data producing one line.

FIG. 12 shows the link transmission and reception unit 33 according to an alternative embodiment. A compression unit 333 is provided to constitute a data transmission part in the link transmission and reception unit 33. A decompression unit 334 is provided to constitute a data reception unit in the link transmission and reception unit 33. In this case, the transferred data for each line is compressed.

The present invention is not limited to the above-described embodiments, and variations and modifications may be made without departing from the scope of the present invention.

What is claim is:

1. An image forming apparatus for use in an image processing system in which image data is transferred in two ways, comprising:
   an image reading unit for reading an original document so as to generate local image data;
   a link transmission and reception unit for exchanging image data and signals relating to control, with another image forming apparatus;
   an image memory for storing image data for at least one line on the original document;
   a first selection unit for selecting one of the local image data generated by said image reading unit and remote image data received from an image forming apparatus on the transmitting side via said link transmission and reception unit;

a data write unit for writing image data selected by said first selection unit to said image memory;

a second selection unit for selecting one of the image data stored in said image memory, the remote image data received from the image processing apparatus on the transmitting side via said link transmission and reception unit and the local image data generated by said image reading unit;

an image output unit for outputting image using image data selected by said second selection unit;

a request signal transmitting unit for transmitting, via said link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side;

a reception ready signal transmitting unit for transmitting, when the request signal is received via said link transmission and reception unit, a reception ready signal indicating that reception of the remote image data is enabled, to the image forming apparatus on the transmitting side, via said transmission and reception unit, prior to receiving the remote image data for one line on the original document;

a reception ready signal receiving unit for receiving the reception ready signal from the image forming apparatus on the receiving side via said link transmission and reception unit; and an image data transmitting unit for transmitting the local image data for one line on the original document, and for transmitting a line synchronization signal and a clock signal synchronized with the local image data, to the image forming apparatus on the receiving side, via said transmission and reception unit, based on the reception ready signal transmitted from the image forming apparatus on the receiving side and received by said reception ready signal receiving unit.

2. The image forming apparatus as claimed in claim 1, wherein the clock signal is generated locally.

3. The image forming apparatus as claimed in claim 1, wherein the clock signal is generated in said another image forming apparatus.

4. The image forming apparatus as claimed in claim 1, further comprising an operation unit for generating image related information based on an input supplied by an operator and for controlling said first selection unit, wherein when said image forming apparatus is used as an image forming apparatus on the transmitting side, the image related information generated in said operation unit is transmitted to the image forming apparatus on the receiving side via said link transmission and reception unit, and when said image forming apparatus is used as an image forming apparatus on the receiving side, the reception ready signal is transmitted to the image forming apparatus on the transmitting side via said link transmission and reception unit, based on the image related information received from the image forming apparatus on the transmitting side.

5. The image forming apparatus as claimed in claim 4, wherein the image related information is a size of the original document.

6. The image forming apparatus as claimed in claim 4, wherein the image related information is the number of outputs.

7. The image forming apparatus as claimed in claim 1, wherein said image memory stores image data for a plurality of original documents.

8. The image forming apparatus as claimed in claim 1, wherein a transfer error is detected line by line or page by page.

9. The image forming apparatus as claimed in claim 1, wherein image data is compressed before transfer.

10. An image forming apparatus provided with an image data transmitting function, comprising:

an image reading unit for reading an original document so as to generate image data;

a link transmission and reception unit for transferring the image data to an image forming apparatus on the receiving side and for exchanging signals relating to control, with the image forming apparatus on the receiving side;

an image memory for storing image data for at least one line on the original document;

a data write unit for writing the image data generated by said image reading unit to said image memory;

a selection unit for selecting one of the image data stored in said image memory, and the image data generated by said image reading unit;

an image output unit for outputting image using image data selected by said selection unit;

a request signal transmitting unit for transmitting, via said link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side;

a reception ready signal receiving unit for receiving the reception ready signal from the image forming apparatus on the receiving side via said link transmission and reception unit; and an image data transmitting unit for transmitting the image data for one line on the original document, and for transmitting a line synchronization signal and a clock signal synchronized with the image data, to the image forming apparatus on the receiving side, via said transmission and reception unit, based on the reception ready signal transmitted from the image forming apparatus on the receiving side and received by said reception ready signal receiving unit.

11. The image forming apparatus as claimed in claim 10, wherein the clock signal is generated locally.

12. The image forming apparatus as claimed in claim 10, wherein the clock signal is generated in said another image forming apparatus.

13. The image forming apparatus as claimed in claim 10, further comprising an operation unit for generating image related information based on an input supplied by an operator, wherein the image related information generated in said operation unit is transmitted to the image forming apparatus on the receiving side via said link transmission and reception unit.

14. The image forming apparatus as claimed in claim 13, wherein the image related information is a size of the original document.

15. The image forming apparatus as claimed in claim 13, wherein the image related information is the number of outputs.

16. The image forming apparatus as claimed in claim 10, wherein the reception ready signal is transmitted to the image forming apparatus on the transmitting side based on the image related information received from the image forming apparatus on the transmitting side.

17. The image forming apparatus as claimed in claim 16, wherein the image related information is a size of the original document.

18. The image forming apparatus as claimed in claim 16, wherein the image related information is the number of outputs.

19. The image forming apparatus as claimed in claim 10, wherein said image memory stores image data for a plurality of original documents.

20. The image forming apparatus as claimed in claim 10, wherein a transfer error is detected line by line or page by page.

21. The image forming apparatus as claimed in claim 10, wherein image data is compressed before transfer.

22. An image forming apparatus provided with an image data receiving function, comprising:
   an image reading unit for reading an original document so as to generate local image data;
   a link transmission and reception unit for exchanging image data and signals relating to control, with another image forming apparatus;
   an image memory for storing image data for at least one line on the original document;
   a first selection unit for selecting one of the local image data generated by said image reading unit and remote image data received from an image forming apparatus on the transmitting side via said link transmission and reception unit;
   a data write unit for writing image data selected by said first selection unit to said image memory;
   a second selection unit for selecting one of the image data stored in said image memory, the remote image data received from the image processing apparatus on the transmitting side via said link transmission and reception unit and the local image data generated by said image reading unit;
   an image output unit for outputting image using image data selected by said second selection unit;
   a reception ready signal transmitting unit for transmitting, when a request signal for requesting image transfer from the image forming apparatus on the transmitting side to an image forming apparatus on the receiving side and also requesting image output at the image forming apparatus on the receiving apparatus is received via said link transmission and reception unit, a reception ready signal indicating that reception of the remote image data is enabled, to the image forming apparatus on the transmitting side, via said transmission and reception unit, prior to receiving the remote image data for one line on the original document; and
   an image data transmitting unit for transmitting the local image data for one line on the original document, and for transmitting a line synchronization signal and a clock signal synchronized with the local image data, to the image forming apparatus on the receiving side, via said transmission and reception unit, based on the reception ready signal transmitted from image forming apparatus on the receiving side and received by said reception ready signal receiving unit.

23. The image forming apparatus as claimed in claim 22, wherein said image memory stores image data for a plurality of original documents.

24. A two-way image processing system for transferring image between at least two image forming apparatuses connected to each other, wherein each of the image forming apparatuses comprises:
   an image reading unit for reading an original document so as to generate local image data;
   a link transmission and reception unit for exchanging image data and signals relating to control, with another image forming apparatus;
   an image memory for storing image data for at least one line on the original document;
   a first selection unit for selecting one of the local image data generated by said image reading unit and remote image data received from an image forming apparatus on the transmitting side via said link transmission and reception unit;
   a data write unit for writing image data selected by said first selection unit to said image memory;
   a second selection unit for selecting one of the image data stored in said image memory, the remote image data received from the image processing apparatus on the transmitting side via said link transmission and reception unit and the local image data generated by said image reading unit;
   an image output unit for outputting image using image data selected by said second selection unit;
   a request signal transmitting unit for transmitting, via said link transmission and reception unit, a request signal for requesting image transfer from the image forming apparatus on the transmitting side to an image forming apparatus on the receiving side and also requesting image output at the image forming apparatus on the receiving apparatus, to the image forming apparatus on the receiving side;
   a reception ready signal transmitting unit for transmitting, when the request signal is received via said link transmission and reception unit, a reception ready signal indicating that reception of the remote image data is enabled, to the image forming apparatus on the transmitting side, via said transmission and reception unit, prior to receiving the remote image data for one line on the original document;
   a reception ready signal receiving unit for receiving the reception ready signal from the image forming apparatus on the receiving side via said link transmission and reception unit; and
   an image data transmitting unit for transmitting the local image data for one line on the original document, and for transmitting a line synchronization signal and a clock signal synchronized with the local image data, to the image forming apparatus on the receiving side, via said transmission and reception unit, based on the reception ready signal transmitted from the image forming apparatus on the receiving side and received by said reception ready signal receiving unit.

25. The two-way image processing system as claimed in claim 24, comprising a first image forming apparatus and a second image forming apparatus, wherein image data from the first image forming apparatus is output only in the first image forming apparatus.

26. The two-way image processing system as claimed in claim 24, comprising a first image forming apparatus and a second image forming apparatus, wherein image data from the first image forming apparatus is output only in the second image forming apparatus.

27. The two-way image processing system as claimed in claim 24, comprising a first image forming apparatus and a second image forming apparatus, wherein image data from the first image forming apparatus is output in the first image forming apparatus and the second image forming apparatus.

28. An image processing method for transferring image data between at least two image forming apparatuses connected to each other, comprising the steps of:

reading an original document so as to generate local image data;

transmitting a request signal for requesting image transfer from an image forming apparatus on the transmitting side to an image forming apparatus on the receiving side and also requesting image output at the image forming apparatus on the receiving apparatus, from the image forming apparatus on the transmitting side to the image forming apparatus on the receiving side;

the image forming apparatus on the receiving apparatus that receives the request signal transmitting a reception ready signal indicating that image reception is enabled, to the image forming apparatus on the transmitting side, prior to receiving remote image for one line on the original document; and the image forming apparatus on the transmitting side transmitting image data for one line on the original document, and for transmitting a line synchronization signal and a clock signal synchronized with the image data, to the image forming apparatus on the receiving side based on the reception ready signal transmitted from the image forming apparatus on the receiving apparatus.

29. An image forming apparatus for use in an image processing system in which image data is transferred in two ways, comprising:

image reading means for reading an original document so as to generate local image data;

link transmission and reception means for exchanging image data and signals relating to control, with another image forming apparatus;

image memory means for storing image data for at least one line on the original document;

first selection means for selecting one of the local image data generated by said image reading means and remote image data received from an image forming apparatus on the transmitting side via said link transmission and reception means;

data write means for writing image data selected by said first selection means to said image memory means;

second selection means for selecting one of the image data stored in said image memory means, the remote image data received from the image processing apparatus on the transmitting side via said link transmission and reception means and the local image data generated by said image reading means;

image output means for outputting image using image data selected by said second selection means;

request signal transmitting means for transmitting, via said link transmission and reception means, a request signal for requesting image transfer from the image forming apparatus on the transmitting side to an image forming apparatus on the receiving side and also requesting image output at the image forming apparatus on the receiving apparatus, to the image forming apparatus on the receiving side;

reception ready signal transmitting means for transmitting, when the request signal is received via said link transmission and reception means, a reception ready signal indicating that reception of the remote image data is enabled, to the image forming apparatus on the transmitting side, via said transmission and reception means, prior to receiving the remote image data for one line on the original document; and reception ready signal receiving means for receiving the reception ready signal from the image forming apparatus on the receiving side via said link transmission and reception means; and image data transmitting means for transmitting the local image data for one line on the original document, and for transmitting a line synchronization signal and a clock signal synchronized with the local image data, to the image forming apparatus on the receiving side, via said transmission and reception means, based on the reception ready signal transmitted from the image forming apparatus on the receiving side and received by said reception ready signal receiving means.

30. The image forming apparatus as claimed in claim 29, wherein the clock signal is generated locally.

31. The image forming apparatus as claimed in claim 29, wherein the clock signal is generated in said another image forming apparatus.

32. The image forming apparatus as claimed in claim 29, further comprising operation means for generating image related information based on an input supplied by an operator and for controlling said first selection means, wherein when said image forming apparatus is used as an image forming apparatus on the transmitting side, the image related information generated in said operation means is transmitted to the image forming apparatus on the receiving side via said link transmission and reception means, and when said image forming apparatus is used as an image forming apparatus on the receiving side, the reception ready signal is transmitted to the image forming apparatus on the transmitting side via said link transmission and reception means, based on the image related information received from the image forming apparatus on the transmitting side.

33. The image forming apparatus as claimed in claim 32, wherein the image related information is a size of the original document.

34. The image forming apparatus as claimed in claim 32, wherein the image related information is the number of outputs.

35. The image forming apparatus as claimed in claim 29, wherein said image memory means stores image data for a plurality of original documents.

36. The image forming apparatus as claimed in claim 29, wherein a transfer error is detected line by line or page by page.

37. The image forming apparatus as claimed in claim 29, wherein image data is compressed before transfer.

38. An image forming apparatus provided with an image data transmitting function, comprising:

image reading means for reading an original document so as to generate image data;

link transmission and reception means for transferring the image data to an image forming apparatus on the receiving side and for exchanging signals relating to control, with the image forming apparatus on the receiving side;

image memory means for storing image data for at least one line on the original document;

data write means for writing the image data generated by said image reading means to said image memory means;

selection means for selecting one of the image data stored in said image memory means, and the image data generated by said image reading means;

image output means for outputting image using image data selected by said selection means;

request signal transmitting means for transmitting, via said link transmission and reception means, a request signal for requesting image transfer from the image forming apparatus on the transmitting side to an image forming apparatus on the receiving side and also requesting image output at the image forming apparatus on the receiving apparatus, to the image forming apparatus on the receiving side;

reception ready signal receiving means for receiving the reception ready signal from the image forming apparatus on the receiving side via said link transmission and reception means; and image data transmitting means for transmitting the image data for one line on the original document, and for transmitting a line synchronization signal and a clock signal synchronized with the image data, to the image forming apparatus on the receiving side, via said transmission and reception means, based on the reception ready signal transmitted from the image forming apparatus on the receiving side and received by said reception ready signal receiving means.

39. The image forming apparatus as claimed in claim 38, wherein the clock signal is generated locally.

40. The image forming apparatus as claimed in claim 38, wherein the clock signal is generated in said another image forming apparatus.

41. The image forming apparatus as claimed in claim 38, further comprising operation means for generating image related information based on an input supplied by an operator, wherein the image related information generated in said operation means is transmitted to the image forming apparatus on the receiving side via said link transmission and reception means.

42. The image forming apparatus as claimed in claim 41, wherein the image related information is a size of the original document.

43. The image forming apparatus as claimed in claim 41, wherein the image related information is the number of outputs.

44. The image forming apparatus as claimed in claim 38, wherein the reception ready signal is transmitted to the image forming apparatus on the transmitting side based on the image related information received from the image forming apparatus on the transmitting side.

45. The image forming apparatus as claimed in claim 44, wherein the image related information is a size of the original document.

46. The image forming apparatus as claimed in claim 44, wherein the image related information is the number of outputs.

47. The image forming apparatus as claimed in claim 38, wherein said image memory means stores image data for a plurality of original documents.

48. The image forming apparatus as claimed in claim 38, wherein a transfer error is detected line by line or page by page.

49. The image forming apparatus as claimed in claim 38, wherein image data is compressed before transfer.

50. An image forming apparatus provided with an image data receiving function, comprising:

image reading means for reading an original document so as to generate local image data;

link transmission and reception means for exchanging image data and signals relating to control, with another image forming apparatus;

image memory means for storing image data for at least one line on the original document;

first selection means for selecting one of the local image data generated by said image reading means and remote image data received from an image forming apparatus on the transmitting side via said link transmission and reception means;

data write means for writing image data selected by said first selection means to said image memory means;

second selection means for selecting one of the image data stored in said image memory means, the remote image data received from the image processing apparatus on the transmitting side via said link transmission and reception means and the local image data generated by said image reading means;

image output means for outputting image using image data selected by said second selection means;

reception ready signal transmitting means for transmitting, when a request signal for requesting image transfer from the image forming apparatus on the transmitting side to an image forming apparatus on the receiving side and also requesting image output at the image forming apparatus on the receiving apparatus is received via said link transmission and reception means, a reception ready signal indicating that reception of the remote image data is enabled, to the image forming apparatus on the transmitting side, via said transmission and reception means, prior to receiving the remote image data for one line on the original document; and an image data transmitting unit for transmitting the local image data for one line on the original document, and for transmitting a line synchronization signal and a clock signal synchronized with the local image data, to the image forming apparatus on the receiving side, via said transmission and reception unit, based on the reception ready signal transmitted from the image forming apparatus on the receiving side and received by said reception ready signal receiving unit.

51. The image forming apparatus as claimed in claim 50, wherein said image memory means stores image data for a plurality of original documents.

* * * * *